United States Patent [19]
Childers

[11] Patent Number: 5,979,814
[45] Date of Patent: Nov. 9, 1999

[54] INVERTIBLE PORTABLE CONTAINER HAVING TWO SEPARATE LENGTHS OF RECORDING TAPE

[75] Inventor: Edwin Ralph Childers, Tucson, Ariz.

[73] Assignee: International Business Machines Corporation, Armonk, N.Y.

[21] Appl. No.: 09/080,196

[22] Filed: May 18, 1998

[51] Int. Cl.[6] .......................... G11B 23/087; G11B 23/04
[52] U.S. Cl. ...................... 242/347.1; 242/345; 242/346; 242/337.1; 242/347; 360/132
[58] Field of Search ............................. 242/347.1, 347, 242/336, 345, 346, 337.1; 360/132

[56] References Cited

U.S. PATENT DOCUMENTS

| | | | |
|---|---|---|---|
| 3,525,086 | 8/1970 | Lichowsky | 340/174.1 |
| 4,195,796 | 4/1980 | Osanai | 242/199 |
| 5,253,246 | 10/1993 | Leonhardt et al. | 369/291 |
| 5,284,308 | 2/1994 | Comeaux et al. | 242/199 |
| 5,297,755 | 3/1994 | Felde et al. | 242/199 |
| 5,547,142 | 8/1996 | Cheatham et al. | 242/338.1 |
| 5,618,005 | 4/1997 | Todd et al. | 242/345.1 |

FOREIGN PATENT DOCUMENTS 59-193587  11/1984  Japan.

*Primary Examiner*—John Q. Nguyen
*Attorney, Agent, or Firm*—John H. Holcombe; Robert M. Sullivan

[57] ABSTRACT

Disclosed is an invertible portable tape container for containing two separate lengths of recording tape for providing rapid access to data. The container may be inserted into a tape drive, preferably by an automated data storage library robot, in either of two relatively inverted positions, allowing rapid access to either of the two separate lengths of recording tape. A generally rectangular housing includes two access openings, respectively to the right side and to the left side. Four tape spools are positioned within the housing, with the spools at one side inverted with respect to those on the other side. Separate sets of tape bearings each supports one of the lengths of recording tape at one of the access openings. Thus, the container may be positioned in either of the two relatively inverted positions in a tape drive having a single tape head and a single drive mechanism for two tape spools, providing rapid access to the data stored on the accessed length of recording tape, compared to a length of tape occupying an entire container.

7 Claims, 3 Drawing Sheets

… …

INVERTIBLE PORTABLE CONTAINER HAVING TWO SEPARATE LENGTHS OF RECORDING TAPE

TECHNICAL FIELD

This invention relates to containers, such as cassettes or cartridges, for containing recording tape, and, more particularly, portable containers for recording tape that are primarily adapted for use with automated data storage libraries.

BACKGROUND OF THE INVENTION

Automated data storage libraries represent a significant investment and a significant proportion of any large data processing complex. For example, in many complexes, the automated data storage libraries represent a majority of the cost of the entire complex. Thus, it is desirable to update libraries and utilize the same storage slots and cartridge handling apparatus rather than to replace the libraries.

The conventional approach to update tape automated data storage libraries is to increase the amount of data stored in each portable container of recording tape by increasing the length of tape by reducing its thickness and/or by increasing the track density and the linear data density of data stored on the tape. The tape head in the data storage drive in an automated data storage library may have to be altered to handle the thinner tape, and has to be altered in each instance of a change in data density in order to handle the increased number of tracks and the increased linear data density, but the same automated cartridge handling apparatus and the same storage slots continue to be utilized. An example of such an automated data storage system comprises the 3495 Automated Dataserver Library.

A more important measure of the performance of an automated data storage library than the absolute capacity is the throughput of the library. A key factor in throughput is the time to data. However, as the amount of data stored in each cartridge or cassette is increased, the speed of accessing that increased data by the library tape drive is often not similarly increased. If the length of the recording tape is increased, the speed of accessing that data may decrease as the time required by the tape drive to wind the tape spools increases to move the desired data to the tape head, thereby increasing the time required to gain access to data on the longer tape.

SUMMARY OF THE INVENTION

It is an object of the present invention to increase the speed of accessing data stored on recording tape in a portable data storage container to be employed in an automated data storage library without changing the cartridge handling apparatus or storage slots of the automated data storage library.

Disclosed is an invertible portable tape container for containing two separate lengths of recording tape for providing rapid access to data. The container may be inserted into a tape drive, for example, by an automated data storage library robot, in either of two relatively inverted positions, allowing rapid access to either of the two separate lengths of recording tape.

The portable tape container comprises a generally rectangular housing having two access openings, one of the access openings positioned to the right side and the other of the access openings positioned to the left side. Four tape spools having drive hubs, all having parallel axes of rotation, are positioned within the generally rectangular housing so the axes form four corners of a quadrilateral, the corners comprising, respectively, an inboard and an outboard left corner and an inboard and an outboard right corner. Each of the left drive hubs is positioned at the same end of each of the left axes and adjacent a hub opening in the generally rectangular housing. Each of the right drive hubs is positioned on the same end of each of the right axes, which is inverted with respect to that of the left drive hubs, and adjacent a hub opening in the generally rectangular housing, the left hub openings on the opposite side of the generally rectangular housing from the right hub openings.

Two sets of tape bearings are provided, each set supporting one of the lengths of recording tape at an access opening. Each set of tape bearings is positioned at one of the access openings in the generally rectangular housing. Each of the two separate lengths of recording tape is wound on the inboard and outboard spools at the same left or right side of the housing, and extends across the tape bearings at the access opening closer to the same side of the housing as the spools.

The two lengths of tape may be wound, when not in use in a drive, so as to have approximately equal lengths thereof wound on each of the spools, and so that the tape at the respective set of tape bearings is substantially the midpoint of the length of tape.

A feature of the portable tape container of the present invention is that it may be quickly and easily inverted by the library during the loading process to present the desired length of tape to the library tape drive.

For a fuller understanding of the present invention, reference should be made to the following detailed description taken in conjunction with the accompanying drawings.

DETAILED DESCRIPTION OF THE INVENTION

Figure 1:
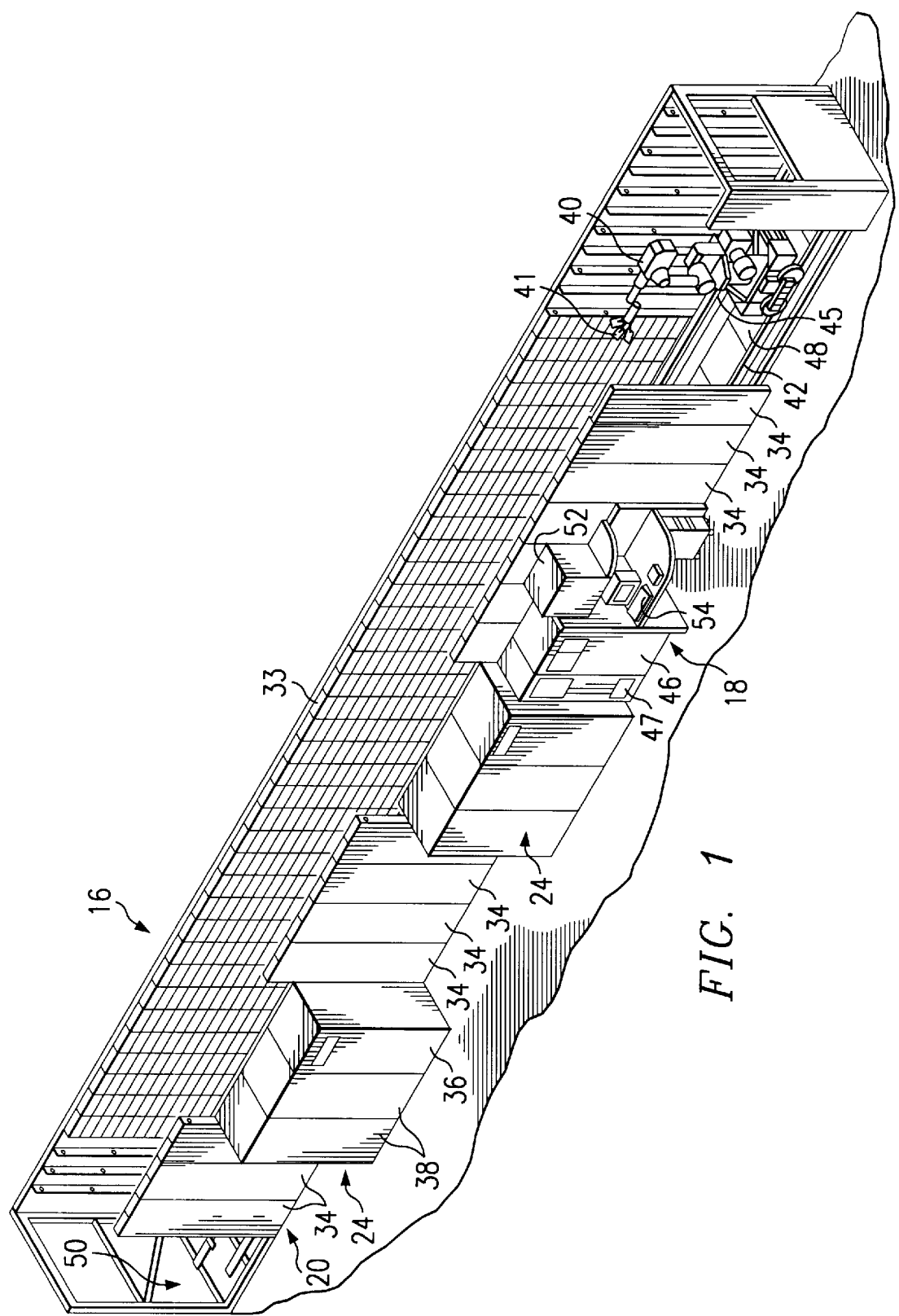
FIG. 1 is a perspective representation of an automated data storage library which may utilize the portable tape containers of the present invention.

Referring to FIG. 1, an automated data storage library 16 is illustrated which includes media storage 20, which may comprise a plurality of columnar modules 34, each having a plurality of storage slots 33 for storing the portable tape containers of the present invention. An example of an automated data storage library is an IBM 3495 Automated Dataserver Library, which is adapted to store a plurality of 3590 Data Storage Cartridges. The library also includes several tape read/write drive units 24, each of which may be an IBM 3590 Magstar Magnetic Tape Subsystem having a tape controller 36 and tape drives 38, modified to handle the portable tape containers of the present invention, as will be described.

In the automated data storage library of FIG. 1, a cartridge picker robot 40 is provided, having a gripper assembly 41 thereon, which travels on an outrigger rail 42 and a guide rail 45 to transfer the portable tape containers between the storage slots 33 and the tape drives 38. A robot controller 46 and a library controller 47, which form parts of a library manager 18, operate the robot 40 and the tape read/write units 24 in response to received commands. The commands are normally received from one or more host computer systems (not shown). A service bay 48 for the robot 40 may be located at one end of the library 16. The service bay 48 functions as a parking space for the robot 40 when it is not in use or when it is being serviced. An operator access bay 50 may be provided at the other end of the library 16 to allow the operator or service personnel to enter the system. A remote terminal bay 52, accessible internally by the service personnel, may be attached to the library 16. An operator station 54 may permit an operator to determine system status and to enter instructions into the library system 16.

The library manager 18 instructs the robot 40 to identify the portable tape containers and to move them to the tape drives 38 for either writing data information on the recording tape or retrieving the data already stored on the recording tape.

Recording tape provides a high volumetric density data storage media at a low cost per media unit. However, throughput and time to data are relatively slow. The 3590 Data Storage Cartridge format is one of the foremost data storage media formats employed for storage of data in automated data storage systems. The format comprises a single reel, generally rectangular cartridge with a leader block at one corner. The single length of magnetic recording tape is wound on the single reel and attached to the leader block. The tape must therefore always be wound from the leader block end onto a spool in the tape drive in order to access data on the recording tape. Thus, the average access time to existing data is the time required to wind the tape from the leader block end to the midpoint of the data, and the average access time to record new data is the time required to wind the tape from the leader block end to the end of the existing data.

Figure 2:
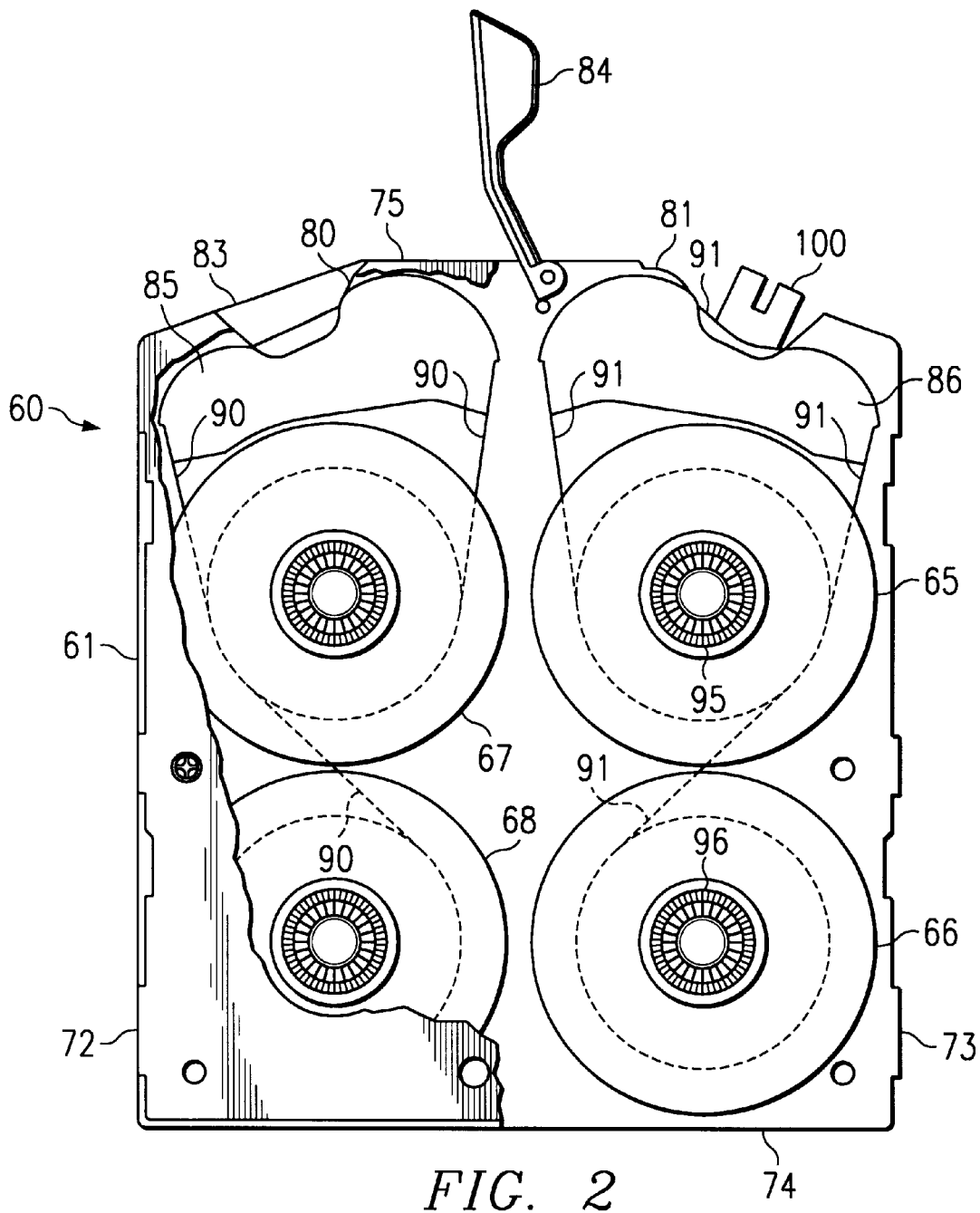
FIG. 2 is a partially cutaway plan view of an embodiment of a portable tape container of the present invention.
Figure 3A:
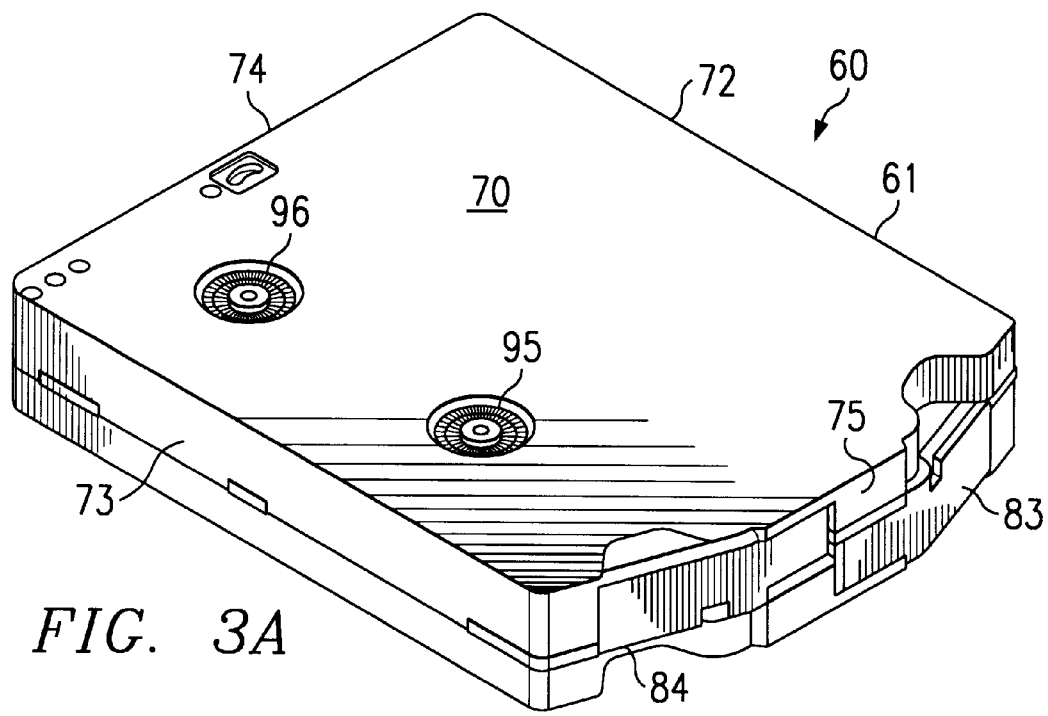
FIG. 3A and 3B are perspective views of the portable tape container of FIG. 2.
Figure 3B:
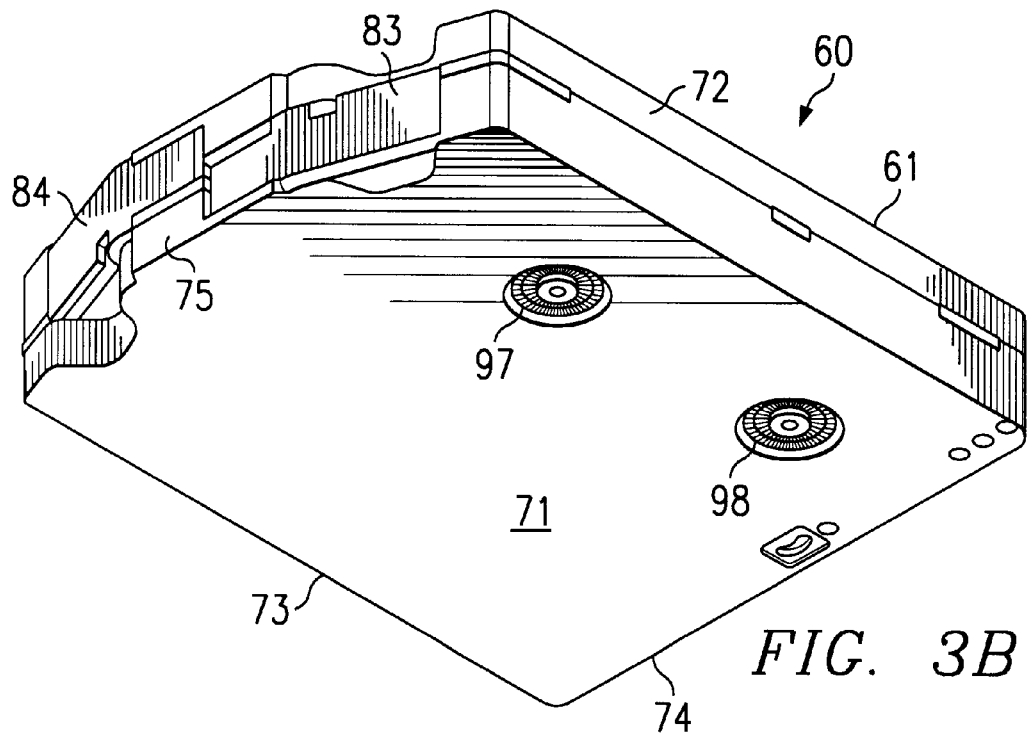

FIGS. 2, 3A and 3B illustrate an embodiment of the present invention wherein a container 60, having a housing 61 of generally rectangular shape and having external dimensions generally conforming to those of an existing 3590 Data Storage Cartridge, is provided with four tape spools 65–68, all having parallel axes of rotation. Referring additionally to FIG. 1, the external dimensions (length, width and height) for the housing may preferably generally conform to those of the existing 3590 Data Storage Cartridge. This facilitates use of the container 60 in the same automated data storage system 16 that employs the existing 3590 Data Storage Cartridge format, employing the same storage slots 33 and robot 40, and replacing only the tape drives 38. The same registration dimensions and the central hub and leader block are not employed in the container 60 since they are only of importance with respect to the tape drives 38, which are replaced.

In FIGS. 2, 3A and 3B, the generally rectangular housing 61 has a top side 70, a bottom side 71, a left side 72, a right side 73, an outboard side 74, and an inboard side 75. The inboard side 75 has two access openings 80 and 81 which are spaced apart in the longitudinal direction. Access opening 81 is positioned to the right side 73 of the housing and access opening 80 is positioned to the left side 72. Each of the access openings 80 and 81 may be protected by an openable door 83 and 84, respectively. In the illustrated embodiment, the doors 83 and 84 pivot towards the center to open.

As shown in FIG. 2, the tape spools 65–68 are positioned within the generally rectangular housing 61 so that their axes form four corners of a quadrilateral. Thus, the corners of the rectangle comprise, respectively, inboard and outboard left corners with spools 67 and 68, and inboard and outboard right corners with spools 65 and 66.

Two sets of tape bearings 85 and 86 are provided, each positioned at one of the access openings 80 and 81, respectively, and between the tape spools and the access opening. Each of the sets of tape bearings supports a length of recording tape 90 and 91, respectively, at the respective access opening.

The length of recording tape 90 is wound on the inboard and outboard tape spools 67 and 68 on the same side of the container. The length of tape extends from inboard tape spool 67 to the set of tape bearings 85 and back past the tape spool 67, preferably in close proximity to or in contact with the same length of tape as wound on the inboard tape spool, to the outboard tape spool 68. Similarly, the length of recording tape 91 extends from inboard tape spool 65 to the set of tape bearings 86 and back past the tape spool 65, again preferably in close proximity or contact with the same length of tape as wound on the inboard tape spool, to the outboard tape spool 66. Coming into close proximity to or in contact with the same length of tape, stabilizes the tape as the tape crosses the tape bearings.

By having four tape spools and two lengths of tape, either of the lengths of tape may be accessed, thereby speeding the time to data since less of the recording tape must be moved on average before the desired data is reached. In accordance with the present invention, the time to data is further improved by winding the lengths of tape, when not in use in a drive, so as to have substantially equal lengths thereof wound on each of the spools, and so that the tape at the respective sets of tape bearings is substantially the midpoint of the length of tape.

In the embodiment of FIGS. 2, 3A and 3B, hubs 95 and 96 for tape spools 65 and 66 are at the same end of the axes of the tape spools and on the top side 70 of the container 60. Hubs 97 and 98 for tape spools 67 and 68 are at the same end of the axes of the tape spools, but on the bottom side 71 of the container, inverted with respect to the hubs 95 and 96.

The pivoting doors 83 and 84 each pivot in opposite directions from each other so that, when the housing 61 is pivoted substantially 180°, the pivoting doors each pivot in the same direction between a closed position covering the respective one of said access openings, and an open position.

Thus, when inserted in one of the tape drives 38 of FIG. 1, the tape drive opens one of the doors and engages the hubs on the side of the container 60 for the length of tape exposed at the open door. A tape head 100 of FIG. 2 of the tape drive then engages the tape as it is supported at the access opening by the set of tape bearings, and the tape drive will rotate the hubs to move the recording tape past the tape head 100 to read and/or write data on the recording tape.

To access the other length of tape, the robot 40 of FIG. 1 instead inserts the container 60 into the tape drive in an inverted position. Specifically, the generally rectangular housing 61 of FIGS. 2, 3A and 3B is inverted by pivoting substantially 180° about a central axis extending from the inboard side of the housing to the outboard side of the housing, so that the hub openings of one side will be at the same positions as the hub openings of the other side. For example, to access tape 91, door 84 is opened and the tape head 100 is inserted into access opening 81. The tape drive then rotates hubs 95 and 96. If instead, tape 90 is to be accessed, the container 60 is inverted, door 83 is opened and the tape head 100 is inserted into access opening 80. The tape drive then rotates hubs 97 and 98. Thus, the same tape head 100 and the same hub drive mechanism may be utilized for both lengths of recording tape.

The container 60 may be inverted by the robot 40 of FIG. 1 as the robot transports the container from its storage slot 33 to the tape drive 38, so that no extra time is required.

Alternatively, the tape drive 38 may have two heads and drive mechanisms so that either length of tape may be accessed without inverting the container 60, or so that both lengths of tape may be accessed simultaneously. The drive mechanisms would be on opposite sides of the container, so that there would be adequate space for each mechanism. The drive mechanisms would move into engagement with the hubs so that both lengths of tape may be accessed simultaneously.

While the preferred embodiments of the present invention have been illustrated in detail, it should be apparent that modifications and adaptations to those embodiments may occur to one skilled in the art without departing from the scope of the present invention as set forth in the following claims.

I claim:

1. A portable tape container for containing two separate lengths of recording tape, comprising:

a generally rectangular housing having a top side, a bottom side, a left side, a right side, an outboard side, and an inboard side, said housing having two access openings at said inboard side, one of said access openings positioned to said right side and the other of said access openings positioned to said left side;

four tape spools having respective drive hubs, all having parallel axes of rotation, said tape spools positioned within said generally rectangular housing so said axes form four corners of a quadrilateral, said corners comprising, respectively, an inboard and an outboard left corner and an inboard and an outboard right corner, each of said drive hubs at the left side of said quadrilateral positioned at the same axial end of each of said axes and adjacent a hub opening in said generally rectangular housing, and each of said drive hubs at the right side of said quadrilateral positioned on the same axial end of each of said axes, which right side drive hubs are inverted with respect to that of said left side drive hubs, and adjacent a hub opening in said generally rectangular housing, said left side hub openings on the axially opposite side of said generally rectangular housing from said right side hub openings;

two sets of tape bearings, each said set of tape bearings positioned at one of said access openings in said generally rectangular housing, each said set of tape bearings for supporting one of said lengths of recording tape at a respective said access opening; and a tape path for each of said two separate lengths of recording tape wound on respective inboard and outboard ones of said tape spools positioned on the same said left or said right side of said quadrilateral, and extending between said respective inboard tape spool to and across said set of tape bearings positioned at said access opening closest to said respective inboard tape spool, said tape paths extending from said respective set of tape bearings to said respective outboard tape spool, whereby, when said generally rectangular housing is inverted by pivoting substantially 180° about a central axis extending from the inboard side of said generally rectangular housing to the outboard side of said generally rectangular housing, said hub openings of one of said sides will be at the same positions as said hub openings of the other of said sides before the housing is inverted.

2. The portable tape container of claim 1, wherein said two tape paths additionally comprise winding said two separate lengths of recording tape, when not in use in a drive, so as to have substantially equal lengths thereof wound on each of said spools, and so that said recording tape at said respective set of tape bearings is substantially the midpoint of said respective length of recording tape.

3. The portable tape container of claim 1, additionally comprising a pivoting door at each of said access openings, said pivoting doors each pivoting in opposite directions from each other so that, when said generally rectangular housing is pivoted substantially 180° about said central axis, said pivoting doors each pivot in the same direction between a closed position covering the respective one of said access openings, and an open position uncovering the access opening.

4. The portable tape container of claim 3, wherein said generally rectangular housing additionally comprises external dimensions generally conforming to the external dimensions for 3590 magnetic tape cartridges.

5. A portable tape container, comprising:

a first length of recording tape;

a second length of recording tape;

a generally rectangular housing having a top side, a bottom side, a left side, a right side, an outboard side, and an inboard side, said housing having two access openings at said inboard side, one of said access openings positioned to said right side and the other of said access openings positioned to said left side;

four tape spools having respective drive hubs, all having parallel axes of rotation, said tape spools positioned within said generally rectangular housing so said axes form four corners of a quadrilateral, said corners comprising, respectively, an inboard and an outboard left corner and an inboard and an outboard right corner, each of said drive hubs at the left side of said quadrilateral positioned at the same axial end of each of said axes and adjacent a hub opening in said generally rectangular housing, and each of said drive hubs at the right side of said quadrilateral positioned on the same axial end of each of said axes, which right side drive hubs are inverted with respect to that of said left side drive hubs, and adjacent a hub opening in said generally rectangular housing, said left side hub openings on the axially opposite side of said generally rectangular housing from said right side hub openings;

two sets of tape bearings, each said set of tape bearings positioned at one of said access openings in said generally rectangular housing, each said set of tape bearings supporting one of said lengths of recording tape at a respective said access opening; and respectively, each of said first and second lengths of recording tape wound on the respective inboard and outboard ones of said tape spools positioned on the same said left or said right side of said quadrilateral, and extending between said respective inboard tape spool to and across said set of tape bearings positioned at said access opening closest to said respective inboard tape spool, said lengths of recording tape extending from said respective set of tape bearings to said respective outboard tape spool, whereby, when said generally rectangular housing is inverted by pivoting substantially 180° about a central axis extending from the inboard side of said generally rectangular housing to the outboard side of said generally rectangular housing, said hub openings of one of said sides will be at the same positions as said hub openings of the other of said sides before the housing is inverted.

6. The portable tape container of claim 5, wherein said first and said second lengths of tape are wound, when not in use in a drive, so as to have substantially equal lengths thereof wound on each of said respective inboard and outboard spools, and so that said recording tape at said respective set of tape bearings is substantially the midpoint of said respective length of recording tape.

7. The portable tape container of claim 5, additionally comprising a pivoting door at each of said access openings, said pivoting doors each pivoting in opposite directions from each other so that, when said generally rectangular housing is pivoted substantially 180° about said central axis, said pivoting doors each pivot in the same direction between a closed position covering the respective one of said access openings, and an open position uncovering the access opening.

\* \* \* \* \*